(12) United States Patent
Silberstein et al.

(10) Patent No.: US 10,101,801 B2
(45) Date of Patent: Oct. 16, 2018

(54) METHOD AND APPARATUS FOR PREFETCHING CONTENT IN A DATA STREAM

(71) Applicant: CISCO TECHNOLOGY, INC., San Jose, CA (US)

(72) Inventors: Rebecca Lynn Braynard Silberstein, Sunnyvale, CA (US); Michael F. Plass, Mountain View, CA (US); Roger C. Meike, Emerald Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 1000 days.

(21) Appl. No.: 14/079,379

(22) Filed: Nov. 13, 2013

(65) Prior Publication Data

US 2015/0134680 A1    May 14, 2015

(51) Int. Cl.
*G06F 7/00*      (2006.01)
*G06F 17/30*     (2006.01)
(Continued)

(52) U.S. Cl.
CPC .......... *G06F 3/002* (2013.01); *H04N 21/4351* (2013.01); *H04N 21/4402* (2013.01);
(Continued)

(58) Field of Classification Search
CPC ........... G06F 17/30867; G06F 12/0811; G06F 17/30; G06F 17/30038; G06F 17/30067;
(Continued)

(56) References Cited

U.S. PATENT DOCUMENTS

| 817,441 A | 4/1906 | Niesz |
|---|---|---|
| 4,309,569 A | 1/1982 | Merkle |

(Continued)

FOREIGN PATENT DOCUMENTS

| DE | 1720277 A1 | 6/1967 |
|---|---|---|
| DE | 19620817 A1 | 11/1997 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.
(Continued)

*Primary Examiner* — Syling Yen
*Assistant Examiner* — Cecile Vo

(57) ABSTRACT

A data-processing system facilitates processing a data stream to assist other devices to pre-fetch elements of the data stream, out-of-sequence, for uninterrupted playback. During operation, the system can receive a data file, and segments the data file into a sequence of content objects. The system then determines a target content object that is to be processed out-of-sequence, and a corresponding source content object. The system then inserts a reference to the target content object, into the source content object, and stores the sequence of content objects. A client device can disseminate interest to obtain the data stream's content objects. Upon receiving a content object, the client device can determine whether the content object includes a reference to other content objects. If so, the client device can disseminate interests for these referenced content objects.

25 Claims, 9 Drawing Sheets

(51) Int. Cl.

| | | |
|---|---|---|
| *G06F 3/00* | (2006.01) | |
| *H04N 21/435* | (2011.01) | |
| *H04N 21/835* | (2011.01) | |
| *H04N 21/845* | (2011.01) | |
| *H04N 21/4402* | (2011.01) | |
| *H04N 21/854* | (2011.01) | |
| *G06F 13/14* | (2006.01) | |
| *H04L 29/08* | (2006.01) | |

(52) U.S. Cl.
CPC ....... *H04N 21/835* (2013.01); *H04N 21/8455* (2013.01); *H04N 21/85406* (2013.01); *H04L 67/06* (2013.01)

(58) Field of Classification Search
CPC ......... G06F 17/30746; G06F 17/30796; G06F 17/30017; G06F 17/30091; G06F 17/30233; G06F 17/30958; G06F 17/30026; G06F 17/30047; G06F 17/30076; G06F 17/30194; G06F 17/30516; G06F 17/30743; G06F 17/3074
USPC ... 707/758, 707, E17.01, E17.044, 827, 736, 707/E17.005, E17.014; 709/231; 711/122, E12.001, E12.061, 154, 206, 711/726
See application file for complete search history.

(56) References Cited

U.S. PATENT DOCUMENTS

| | | | |
|---|---|---|---|
| 4,921,898 A | 5/1990 | Lenney | |
| 5,070,134 A | 12/1991 | Oyamada | |
| 5,110,856 A | 5/1992 | Oyamada | |
| 5,506,844 A | 4/1996 | Rao | |
| 5,629,370 A | 5/1997 | Freidzon | |
| 5,870,605 A | 2/1999 | Bracho | |
| 6,052,683 A | 4/2000 | Irwin | |
| 6,091,724 A | 7/2000 | Chandra | |
| 6,173,364 B1 | 1/2001 | Zenchelsky | |
| 6,226,618 B1 | 5/2001 | Downs | |
| 6,233,646 B1 | 5/2001 | Hahm | |
| 6,332,158 B1 | 12/2001 | Risley | |
| 6,366,988 B1 | 4/2002 | Skiba | |
| 6,574,377 B1 | 6/2003 | Cahill | |
| 6,654,792 B1 | 11/2003 | Verma | |
| 6,667,957 B1 | 12/2003 | Corson | |
| 6,681,220 B1 | 1/2004 | Kaplan | |
| 6,681,326 B2 | 1/2004 | Son | |
| 6,769,066 B1 | 7/2004 | Botros | |
| 6,772,333 B1 | 8/2004 | Brendel | |
| 6,862,280 B1 | 3/2005 | Bertagna | |
| 6,901,452 B1 | 5/2005 | Bertagna | |
| 6,917,985 B2 | 7/2005 | Madruga | |
| 6,968,393 B1 | 11/2005 | Chen | |
| 6,977,934 B1* | 12/2005 | Dalby | H04L 29/06 370/394 |
| 6,981,029 B1 | 12/2005 | Menditto | |
| 7,013,389 B1 | 3/2006 | Srivastava | |
| 7,031,308 B2 | 4/2006 | Garcia-Luna-Aceves | |
| 7,061,877 B1 | 6/2006 | Gummalla | |
| 7,206,860 B2 | 4/2007 | Murakami | |
| 7,257,837 B2 | 8/2007 | Xu | |
| 7,287,275 B2 | 10/2007 | Moskowitz | |
| 7,315,541 B1 | 1/2008 | Housel | |
| 7,339,929 B2 | 3/2008 | Zelig | |
| 7,350,229 B1 | 3/2008 | Lander | |
| 7,376,790 B2* | 5/2008 | Lango | G06F 12/0866 711/126 |
| 7,382,787 B1 | 6/2008 | Barnes | |
| 7,444,251 B2 | 10/2008 | Nikovski | |
| 7,466,703 B1 | 12/2008 | Arunachalam | |
| 7,472,422 B1 | 12/2008 | Agbabian | |
| 7,496,668 B2 | 2/2009 | Hawkinson | |
| 7,509,425 B1 | 3/2009 | Rosenberg | |
| 7,523,016 B1 | 4/2009 | Surdulescu | |
| 7,529,806 B1* | 5/2009 | Shteyn | H04N 7/17318 705/50 |
| 7,543,064 B2 | 6/2009 | Juncker | |
| 7,552,233 B2 | 6/2009 | Raju | |
| 7,555,482 B2 | 6/2009 | Korkus | |
| 7,555,563 B2 | 6/2009 | Ott | |
| 7,567,547 B2 | 7/2009 | Mosko | |
| 7,567,946 B2 | 7/2009 | Andreoli | |
| 7,580,971 B1 | 8/2009 | Gollapudi | |
| 7,623,535 B2 | 11/2009 | Guichard | |
| 7,647,507 B1 | 1/2010 | Feng | |
| 7,660,324 B2 | 2/2010 | Oguchi | |
| 7,685,290 B2 | 3/2010 | Satapati | |
| 7,698,463 B2 | 4/2010 | Ogier | |
| 7,747,625 B2* | 6/2010 | Gargi | G06F 17/30274 707/705 |
| 7,769,887 B1 | 8/2010 | Bhattacharyya | |
| 7,779,467 B2 | 8/2010 | Choi | |
| 7,801,177 B2 | 9/2010 | Luss | |
| 7,816,441 B2 | 10/2010 | Elizalde | |
| 7,831,733 B2 | 11/2010 | Sultan | |
| 7,908,337 B2 | 3/2011 | Garcia-Luna-Aceves | |
| 7,924,837 B1 | 4/2011 | Shabtay | |
| 7,953,885 B1 | 5/2011 | Devireddy | |
| 8,000,267 B2 | 8/2011 | Solis | |
| 8,010,691 B2 | 8/2011 | Kollmansberger | |
| 8,074,289 B1 | 12/2011 | Carpentier | |
| 8,117,441 B2 | 2/2012 | Kurien | |
| 8,160,069 B2 | 4/2012 | Jacobson | |
| 8,204,060 B2 | 6/2012 | Jacobson | |
| 8,214,364 B2 | 7/2012 | Bigus | |
| 8,224,985 B2 | 7/2012 | Takeda | |
| 8,225,057 B1 | 7/2012 | Zheng | |
| 8,271,578 B2 | 9/2012 | Sheffi | |
| 8,312,064 B1 | 11/2012 | Gauvin | |
| 8,386,622 B2 | 2/2013 | Jacobson | |
| 8,467,297 B2 | 6/2013 | Liu | |
| 8,553,562 B2 | 10/2013 | Allan | |
| 8,572,214 B2 | 10/2013 | Garcia-Luna-Aceves | |
| 8,654,649 B2 | 2/2014 | Vasseur | |
| 8,665,757 B2 | 3/2014 | Kling | |
| 8,667,172 B2 | 3/2014 | Ravindran | |
| 8,688,619 B1 | 4/2014 | Ezick | |
| 8,699,350 B1 | 4/2014 | Kumar | |
| 8,750,820 B2 | 6/2014 | Allan | |
| 8,761,022 B2 | 6/2014 | Chiabaut | |
| 8,762,477 B2 | 6/2014 | Xie | |
| 8,762,570 B2 | 6/2014 | Qian | |
| 8,762,707 B2 | 6/2014 | Killian | |
| 8,767,627 B2 | 7/2014 | Ezure | |
| 8,817,594 B2 | 8/2014 | Gero | |
| 8,826,381 B2 | 9/2014 | Kim | |
| 8,832,302 B1 | 9/2014 | Bradford | |
| 8,836,536 B2 | 9/2014 | Marwah | |
| 8,862,774 B2 | 10/2014 | Vasseur | |
| 8,903,756 B2 | 12/2014 | Zhao | |
| 8,937,865 B1 | 1/2015 | Kumar | |
| 9,071,498 B2 | 6/2015 | Beser | |
| 9,112,895 B1 | 8/2015 | Lin | |
| 2002/0010795 A1 | 1/2002 | Brown | |
| 2002/0048269 A1 | 4/2002 | Hong | |
| 2002/0054593 A1 | 5/2002 | Morohashi | |
| 2002/0077988 A1 | 6/2002 | Sasaki | |
| 2002/0078066 A1 | 6/2002 | Robinson | |
| 2002/0138551 A1 | 9/2002 | Erickson | |
| 2002/0176404 A1 | 11/2002 | Girard | |
| 2002/0188605 A1 | 12/2002 | Adya | |
| 2002/0199014 A1 | 12/2002 | Yang | |
| 2003/0046437 A1 | 3/2003 | Eytchison | |
| 2003/0048793 A1 | 3/2003 | Pochon | |
| 2003/0051100 A1 | 3/2003 | Patel | |
| 2003/0074472 A1 | 4/2003 | Lucco | |
| 2003/0097447 A1 | 5/2003 | Johnston | |
| 2003/0140257 A1 | 7/2003 | Paterka | |
| 2004/0024879 A1 | 2/2004 | Dingman | |
| 2004/0030602 A1 | 2/2004 | Rosenquist | |
| 2004/0073715 A1 | 4/2004 | Folkes | |

(56) References Cited

U.S. PATENT DOCUMENTS

| | | |
|---|---|---|
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0276989 A1* | 11/2007 | Mosek ............... G06F 12/0862 711/103 |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |

(56) References Cited

U.S. PATENT DOCUMENTS

| | | |
|---|---|---|
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 2016, Journal of Network$.

Detti et al., "Supporting the Web with an information centric network that routes by name", Aug. 2012, Computer Networks 56, pp. 3705-3702.

Garcia-Luna-Aceves et al., "Automatic Routing Using Multiple Prefix Labels", 2012, IEEE, Ad Hoc and Sensor Networking Symposium.

Hoque et al., 'NLSR: Named-data Link State Routing Protocol', Aug. 12, 2013, ICN 2013, pp. 15-20.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

L. Wang et al., 'OSPFN: An OSPF Based Routing Protocol for Named Data Networking,' Technical Report NDN-0003, 2012.

Merindol et al., "An efficient algorithm to enable path diversity in link state routing networks", Jan. 10, Computer Networks 55 (2011), pp. 1132-1140.

(56) References Cited

OTHER PUBLICATIONS

Soh et al., "Efficient Prefix Updates for IP Router Using Lexicographic Ordering and Updateable Address Set", Jan. 2008, IEEE Transactions on Computers, vol. 57, No. 1.
V. Jacobson et al., 'Networking Named Content,' Proc. IEEE CoNEXT '09, Dec. 2009.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
C. Gentry and A. Silverberg. Hierarchical ID-Based Cryptography. Advances in Cryptology—ASIACRYPT 2002. Springer Berlin Heidelberg (2002).
D. Boneh and M. Franklin. Identity-Based Encryption from the Weil Pairing. Advances in Cryptology—CRYPTO 2001, vol. 2139, Springer Berlin Heidelberg (2001).
H. Xiong, X. Zhang, W. Zhu, and D. Yao. CloudSeal: End-to$2.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digital Rights Management using Broadcast Encryption. Proceedings of the IEEE 92.6 (2004).
J. Shao and Z. Cao. CCA-Secure Proxy Re-Encryption without Pairings. Public Key Cryptography. Springer Lecture Notes in Computer Science vol. 5443 (2009).
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

(56) References Cited

OTHER PUBLICATIONS

E. Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Hur, "Improving security and efficiency in attribute-based data sharing," IEEE Trans. Knowledge Data Eng., vol. 25, No. 10, pp. 2271-2282, Oct. 2013.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

M. Naor and B. Pinkas "Efficient trace and revoke schemes," in Proc. FC 2000, Anguilla, British West Indies, Feb. 2000, pp. 1-20.

M. Nystrom, S. Parkinson, A. Rusch, and M. Scott, "PKCS#12: Personal information exchange syntax v. 1.1," IETF RFC 7292, K. Moriarty, Ed., Jul. 2014.

M. Parsa and J.J. Garcia-Luna-Aceves, "A Protocol for Scalable Loop-free Multicast Routing." IEEE JSAC, Apr. 1997.

M. Walfish, H. Balakrishnan, and S. Shenker, "Untangling the web from DNS," in Proc. USENIX NSDI 2004, Oct. 2010, pp. 735-737.

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. vol. 36. No. 4. ACM, 2006.

Matocha, Jeff, and Tracy Camp. 'A taxonomy of distributed termination detection algorithms.' Journal of Systems and Software 43.3 (1998): 207-221.

Matteo Varvello et al., "Caesar: A Content Router for High Speed Forwarding", ICN 2012, Second Edition on Information-Centric Networking, New York, Aug. 2012.

McWilliams, Jennifer A., and Iain S. Walker. "Home Energy Article: A Systems Approach to Retrofitting Residential HVAC Systems." Lawrence Berkeley National Laboratory (2005).

Mobility First Project [online], http://mobilityfirst.winlab.rutgers.edu/, Downloaded Mar. 9, 2015.

Narasimhan, Sriram, and Lee Brownston. "HyDE—A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

S. Deering, "Multicast Routing in Internetworks and Extended LANs," Proc. ACM SIGCOMM '88, Aug. 1988.

S. Deering et al., "The PIM architecture for wide-area multicast routing," IEEE/ACM Trans, on Networking, vol. 4, No. 2, Apr. 1996.

(56) References Cited

OTHER PUBLICATIONS

S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
D. Trossen and G. Parisis, "Designing and realizing and information-centric internet," IEEE Communications Magazing, vol. 50, No. 7, pp. 60-67, Jul. 2012.
Gasti, Paolo et al., 'DoS & DDoS in Named Data Networking', 2013 22nd International Conference on Computer Communications and Networks (ICCCN), Aug. 2013, pp. 1-7.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug. 12,2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Anteniese et al., "Improved Proxy Re-Encryption Schemes with Applications to Secure Distributed Storage", 2006.
Xie et al. "Collaborative Forwarding and Caching in Content Centric Networks", Networking 2012.
Amadeo et al. "Design and Analysis of a Transport-Level Solution for Content-Centric VANETs", University "Mediterranea" of Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

* cited by examiner

METHOD AND APPARATUS FOR PREFETCHING CONTENT IN A DATA STREAM

RELATED APPLICATION

The subject matter of this application is related to the subject matter of the following application:

U.S. patent application Ser. No. 13/720,736, entitled "DYNAMIC ROUTING PROTOCOLS USING DATABASE SYNCHRONIZATION," by inventors Van L. Jacobson and Marc E. Mosko, filed 19 Dec. 2012;

the disclosures of which are incorporated by reference in their entirety herein.

BACKGROUND

Field

This disclosure is generally related to a system for transferring a data stream to a client device. More specifically, this disclosure is related to a method for segmenting a data stream into a sequence of content objects, and using a reference in a content object to obtain one or more other out-of-sequence content objects from the data stream.

Related Art

Widespread use of the Internet has made it easier for people to consume digital content without traveling to a store to purchase physical copies. A user's client device can obtain the digital content, such as streaming media and executable files, from a dedicated server. For example, media playing programs can present a media stream to the user while the media stream is being downloaded, when the media stream is encoded into a predetermined sequence of frames that are to be processed in-order.

Some media formats require a media player to seek or skip to other portions of the media stream to read the necessary portions before resuming playback. However, web browsers and download managers typically download data files in-sequence. Hence, presenting the media stream during download can require the media player to pause playback of the content until the necessary portions are downloaded, which leads to an interrupted playback experience. Similarly, when operating systems download a binary executable file to execute for the user, the entire file needs to be downloaded before the file can be executed. However, downloading complete software applications can cause the user to wait for an undesirably long period of time, especially when the executable files are significantly large.

SUMMARY

One embodiment provides a data-processing system that facilitates processing a data stream out-of-sequence for uninterrupted playback. During operation, the system can receive a data file, and segments the data file into a sequence of content objects. The system then determines a target content object that is to be processed out-of-sequence and a source content object for the target content object. Source content objects are content objects that are to be processed preceding the target content objects. The system then inserts a reference indicating the target content object into the source content object, and stores the sequence of content objects.

In some embodiments, the data file includes a plurality of data items, wherein a content object's boundaries can coincide with a data item's beginning boundary, ending boundary, or an offset between the beginning and ending boundaries.

In some embodiments, the reference comprises one or more of an identifier for a target object, and a data offset within the target content object. The target object identifier indicates which content object will be processed next, and the data offset indicates an offset within the target content object.

In some embodiments, the content object contains a name containing a hierarchically structured variable-length identifier (HSVLI).

In some embodiments, the data file includes a media stream.

In some variations to these embodiments, the system encodes the media stream into a target format, and generates a data file that includes the media stream in the target format.

In some embodiments, the file type can include a media stream, a text stream, a command sequence, an executable file, a compressed file, an image file, an encrypted file, and/or any data format now known or later developed.

In some embodiments, the system determines that the content object is stored in a local repository, and sends the content object to an interface associated with the interest.

In some embodiments, the system publishes a sequence of content objects by disseminating an advertisement for the content object over a content-centric network.

One embodiment provides a client computer that can disseminate an interest for digital content. Upon receiving a content object corresponding to the digital content, the client computer determines that the received content object includes a reference to a data item from a target content object. The client computer then disseminates an interest for the target content object to obtain the data item.

In some embodiments, the system generates an interest for a successive content object in the sequence, and disseminates the interest to obtain the successive content object. In doing so, the system processes data in-sequence when there are no references to target content objects.

BRIEF DESCRIPTION OF THE FIGURES

In the figures, like reference numerals refer to the same figure elements.

DETAILED DESCRIPTION

Figure 1:
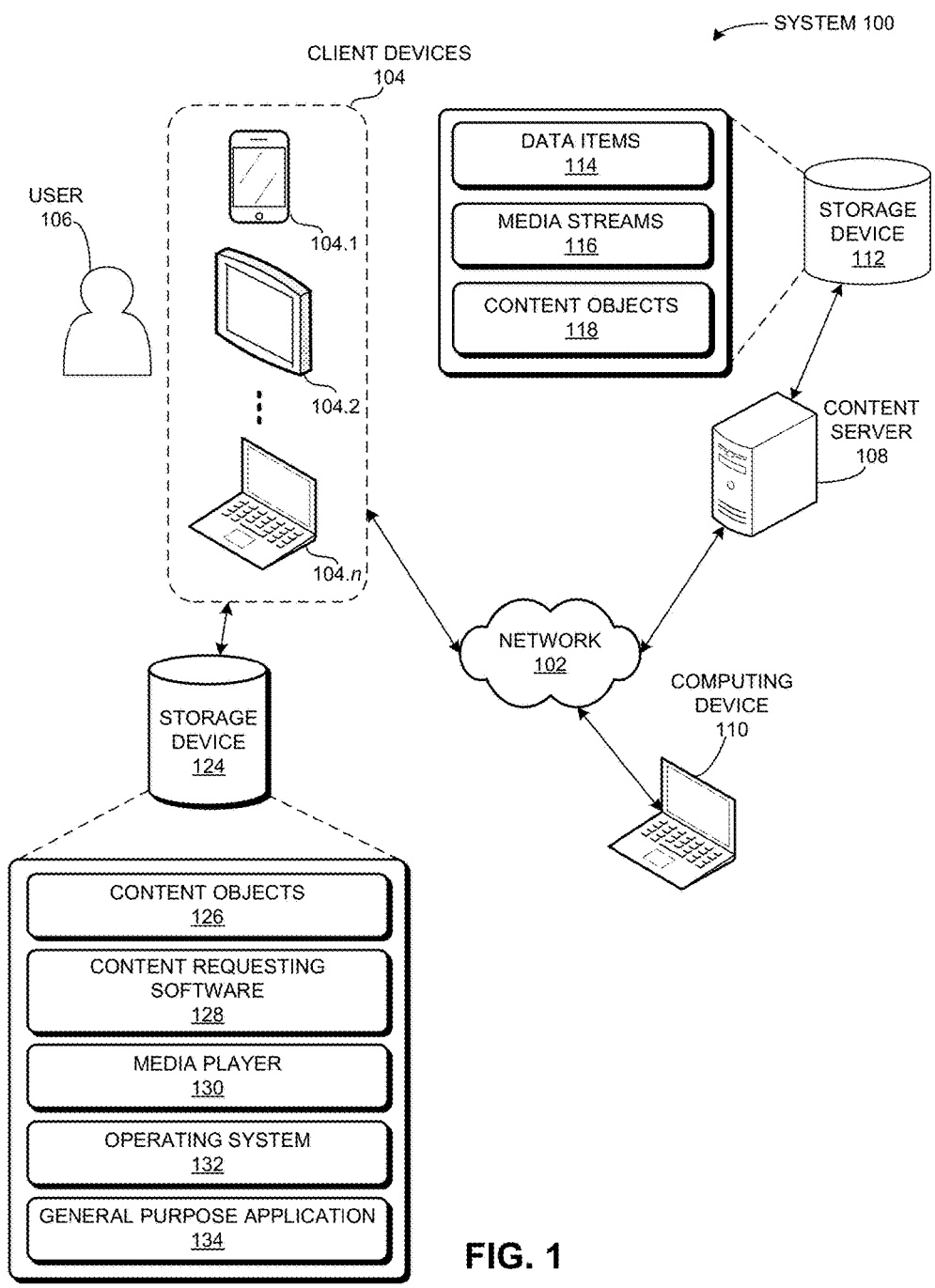
FIG. 1 illustrates an exemplary computer system that facilitates processing data files from various local and remote computing devices in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a content-streaming system that solves the problem of interrupted streaming of content to a user when the streaming content includes data that is to be processed out-of-sequence. During operation, the system inserts references while segmenting the data into content objects. For example, a server can segment a media stream or file into a sequence of content objects, and can serve these content objects to satisfy interests for the file or for a specific content object. While segmenting the data file, the system can determine which target content objects are to be processed out-of-sequence, and determines source content objects that are to be processed preceding these target content objects. The system then inserts references into these source content objects to indicate the target content object, and an offset within these target content object.

In the disclosure, the term "successive" content object refers to a content object that is to be processed following a source content object in a data stream's predetermined sequence of content objects.

In some embodiments, the data file can include a plurality of data items, and the content object boundaries may not always be aligned with a data item's beginning or ending boundaries. For example, the system may generate the content objects to have a predetermined fixed length, or may generate the content objects to have a variable length for including one or more data items. In any case, the system generates the reference to indicate a content object, and to indicate an offset form which the target data item begins within the content object. A client device can decode a reference from a content object to obtain a recommendation for other content objects to cache or process next.

Streaming Data Out-of-Sequence

Typical data streaming techniques often produce adequate streaming results when the stream's data is to be processed in-sequence, but fail to produce an acceptable user experience if the stream's data items are to be processed out-of-sequence. Specifically, a client device may disseminate an interest for a data stream hosted by a remote content server, and the content server may stream the data stream in-sequence. However, if the client device needs to perform out-of-sequence processing of the stream's data items, the client device may need to interrupt the processing of the data stream until the client device receives a desired data item. For example, the client device may need to process a non-streaming video file whose index is located at the end of the file. In such a case, a typical client device would need to download the complete file in order to use the index to determine a media format for each audio or video data item, and/or to determine which data item to play next.

FIG. 1 illustrates an exemplary computer system 100 that facilitates processing data files from various local and remote computing devices in accordance with an embodiment. Computer system 100 can include a client device 104, which can include a computer, a tablet, a smartphone, or any other device with computational capability and a network-interfacing mechanism for communicating data over network 102. A client device 104 can obtain data by generating and disseminating an interest for the data. The interest may be satisfied locally by an application within the client device, or by a remote device accessible via a network 102.

For example, client device 104 can include or be coupled to a storage device 124, which may store content objects 126, content-requesting software 128, a media player 130, and an operating system 132. Media player 130 and/or operating system 132 can use content-requesting software 128 to disseminate an interest for data (e.g., a media stream). If the data's content objects are stored locally, client device can satisfy the interest using content objects 126. Otherwise, client device 104 disseminates the interest over network 102, which allows a remote network device 110 or a content server 108 to satisfy the interest.

Content server 108 can include or be coupled to a storage device 112, which may store data items 114, and a media streams 116. Further, content server 108 can process data items 114 and media streams 116 to generate content objects 118, and can store content objects 118 in storage device 112. Data items 114 can include any type of data including a media stream, a text document, an encrypted message, and executable files.

Network 102 can generally include any type of wired or wireless communication channel capable of coupling together various computing nodes. This includes, but is not limited to, a local area network, a wide area network, a wireless cellular network, or a combination of networks. In one embodiment of the present invention, network 102 implements a content-centric network.

Figure 2A:
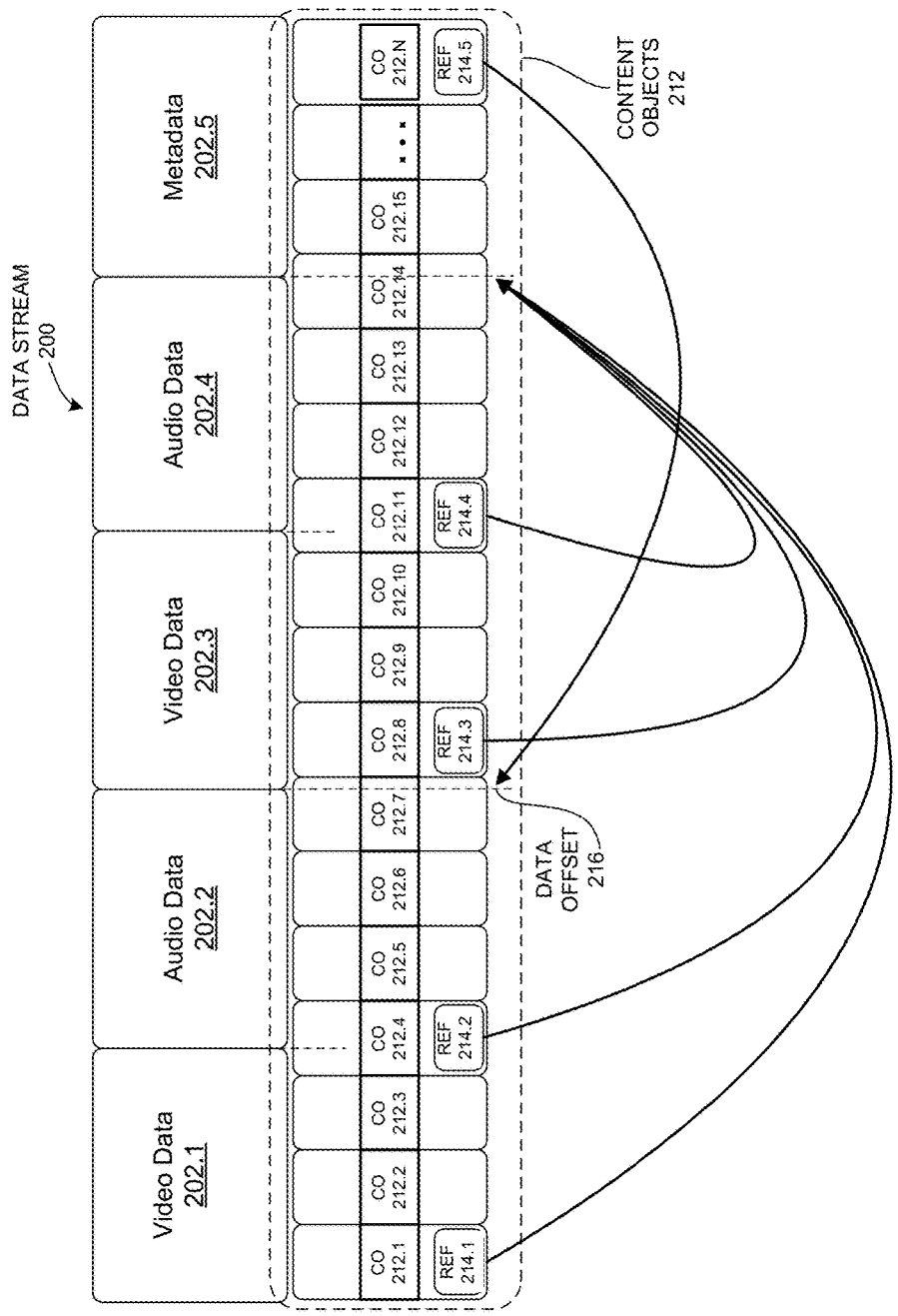
FIG. 2A illustrates a media stream which has been segmented into a plurality of content objects in accordance with an embodiment.

FIG. 2A illustrates a data stream 200 which has been segmented into a plurality of content objects 212 in accordance with an embodiment. Data stream 200 can comprise a plurality of data items 202 that includes video data items, audio data items, and metadata for data stream 200. In some embodiments, some content objects can include a reference that indicates a recommendation for data from one or more other content objects. For example, content objects 212.1-212.14 may include a reference to metadata 202.5, which indicates how a media player is to process the video and audio data items 202.1-202.4. Hence, the first content object for each video or audio item 202.1-202.4 may include a reference to the start of metadata 202.5 at content object 212.14. Metadata 202.5 can include each of video and audio segments 202.1-202.4, a media-data description that includes formatting information and a playback configuration for the corresponding media data. Each of these media-data descriptions in metadata 202.5 may also include a reference to the corresponding video or audio segment that it describes (e.g., reference 214.5 for video data 202.3, starting at an offset 216 of content object 212.7). While processing the content objects for each audio or video data item (e.g., while processing content object 212.1), the client device can generate interest for both the referenced metadata 202.5 (content object 212.14) as well as for a successive content object (e.g., content object 212.2 following content object 212.1).

In some embodiments, a content object may not include reference data, such as content objects 212.2 and 212.3. While processing these content objects, the client device can generate an interest for the successive content object in the sequence. For example, when the client device determines that content object 212.3 does not include a reference, the client device generates an interest for the successive content object 212.4 to be processed following content object 212.3.

Data stream 200 can also include information other than media streams. For example, data stream 200 can include blocks of executable code that form an application that can be executed before the complete application is downloaded. Each data item 202 can correspond to one or more basic blocks of code, and each reference 214 can correspond to a jump or branch operation to a target block of code and/or for other application resources. Specifically, the client device may execute the code before receiving the full application. As in a media stream, the client device may receive the code in the form of content objects. While executing code from one content object, the client device can disseminate interest for other content objects that are referenced by the current content object, which allows the client device to download urgent application resources before non-urgent application resources.

Data stream 200 may also be simple file formats, such as compressed image files (e.g., a graphical interchange format (GIF) file) or other compressed data. Data stream 200 can include a sequence of protocol blocks and sub-blocks representing graphics elements of the GIF file. Each data item 202 can correspond to one or more blocks of data containing protocol blocks or sub-blocks, and each reference 214 can correspond to a shift to an unrelated graphic element. Using the references, the client device may decode and display a GIF image without any unnecessary shifts to unrelated graphics elements. In doing so, the client device can minimize the number of hardware parameter resets and the delays that correspond to parameter resets when loading a GIF image.

Figure 2B:
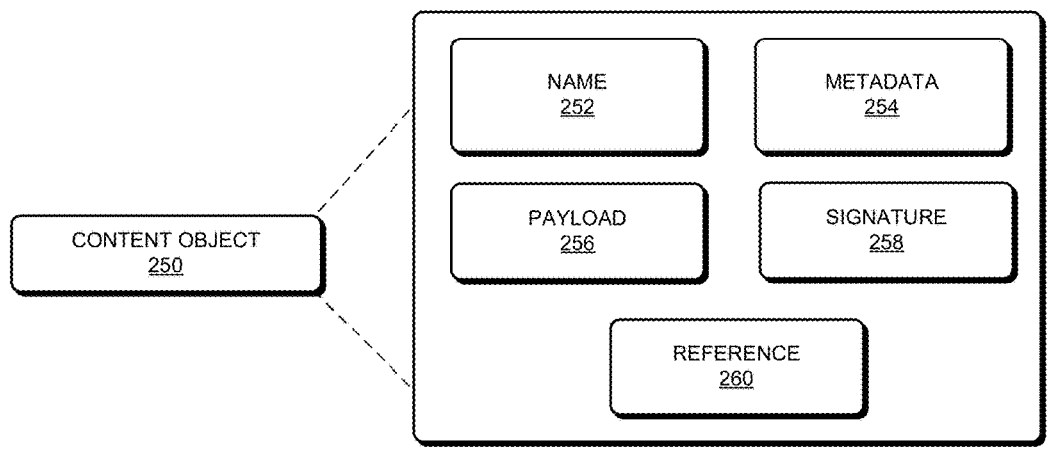
FIG. 2B illustrates information provided by a content object in accordance with an embodiment.

FIG. 2B illustrates information provided by a content object 250 in accordance with an embodiment. Content object 250 can include a location-independent structured name 252, such as a hierarchically structured variable-length identifier (HSVLI). Additionally, content object 250 can include metadata 254, payload 256, and a signature 258. Metadata 254 can include general information necessary for clients and servers to send or receive the appropriate content objects. Payload 256 can include the data items located in a content object. Content object 250 may also include a reference 260, which references data from a target content object. In some embodiments, only some content objects in a data stream include reference 260 for data that is to be processed out-of-sequence.

Figure 2C:
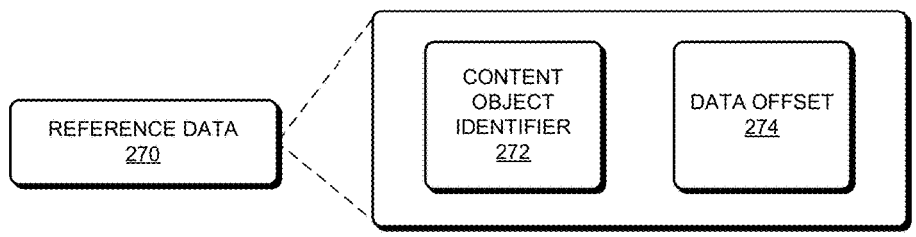
FIG. 2C illustrates information provided by reference data in accordance with an embodiment.

FIG. 2C illustrates information provided by reference data 270 in accordance with an embodiment. Specifically, reference data 270 includes a content object identifier 272 and a data offset 274, which together recommend a data item to process or cache for the user. Content object identifier 272 indicates another content object that needs to be processed or cached next, and data offset 274 indicates the start of the recommended data item from the content object. In some variations, an instance of reference data 270 does not include an explicit data offset 274, which implies that the start of the referenced data item is aligned with the start of the content object.

Figure 3:
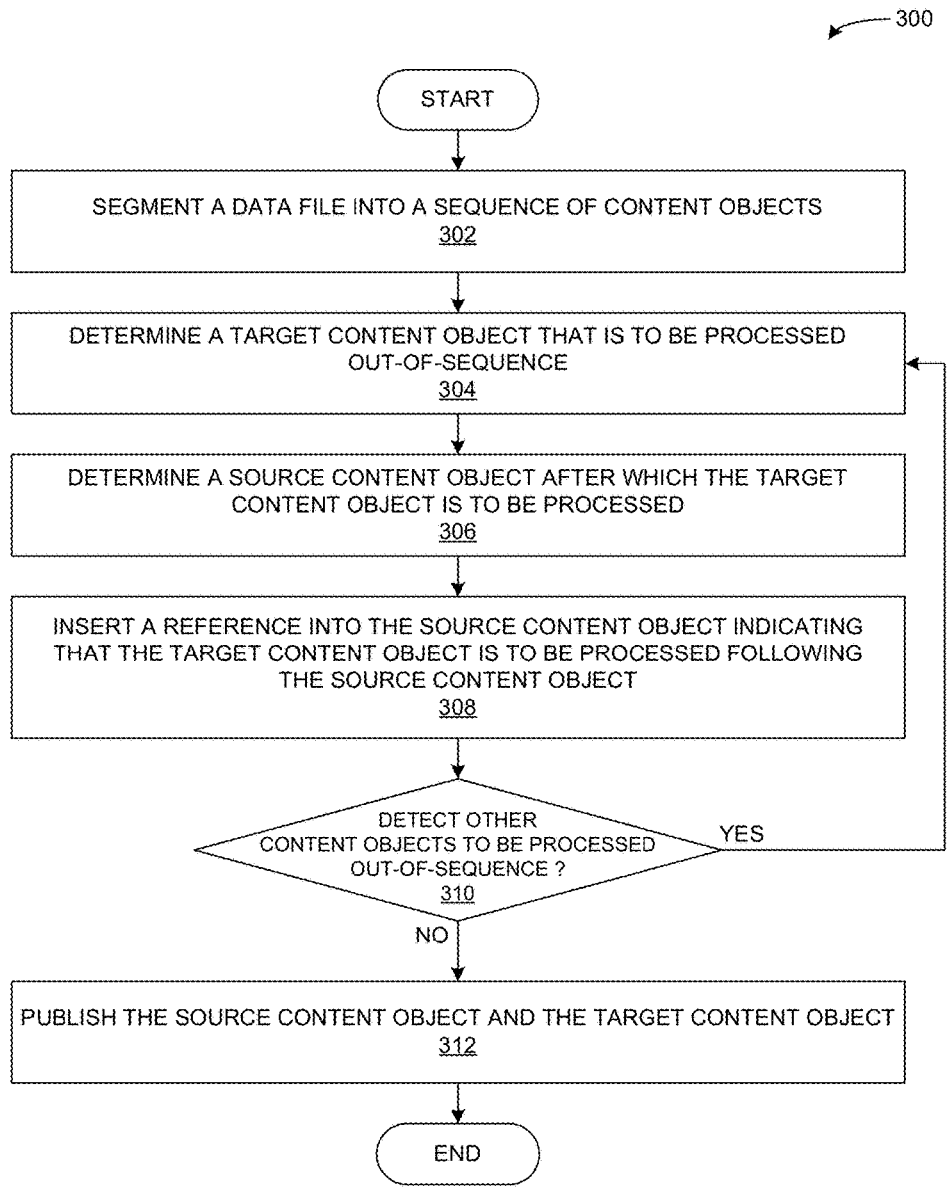
FIG. 3 presents a flow chart illustrating a method for segmenting a data file and inserting a reference into a content object in accordance with an embodiment.

FIG. 3 presents a flow chart illustrating a method for segmenting a data file and inserting a reference into a content object in accordance with an embodiment. During operation, the system segments a data file into a sequence of content objects (operation 302). These content objects function as data packets that facilitate transferring the data file to a remote device, and are stored in a CCN repository to satisfy interests for the data file or for a specific content object.

After segmenting the file into content objects, the system analyzes the content objects to determine one or more target content objects that are to be processed out-of-sequence by a client device (operation 304). The system then determines, for each target content object, the source object after which the target content object is to be processed (operation 306). The system inserts a reference into the source content object, which indicates a recommendation for a data item in the target content object (operation 308). A client device can use the embedded recommendation to process or cache the target content object following the source content object. In some embodiments, the reference includes information indicating a location-independent identifier for the target content object (e.g., an HSVLI name), and the data offset within the target content object. The system then determines whether there are more content objects to be processed out-of-sequence (operation 310). If target content objects remain, the system returns to operation 304. Otherwise, the system proceeds to publish the content objects that together make up the data file (operation 312). The system can publish a content object by disseminating an advertisement for the content object over a content-centric network.

Figure 4:
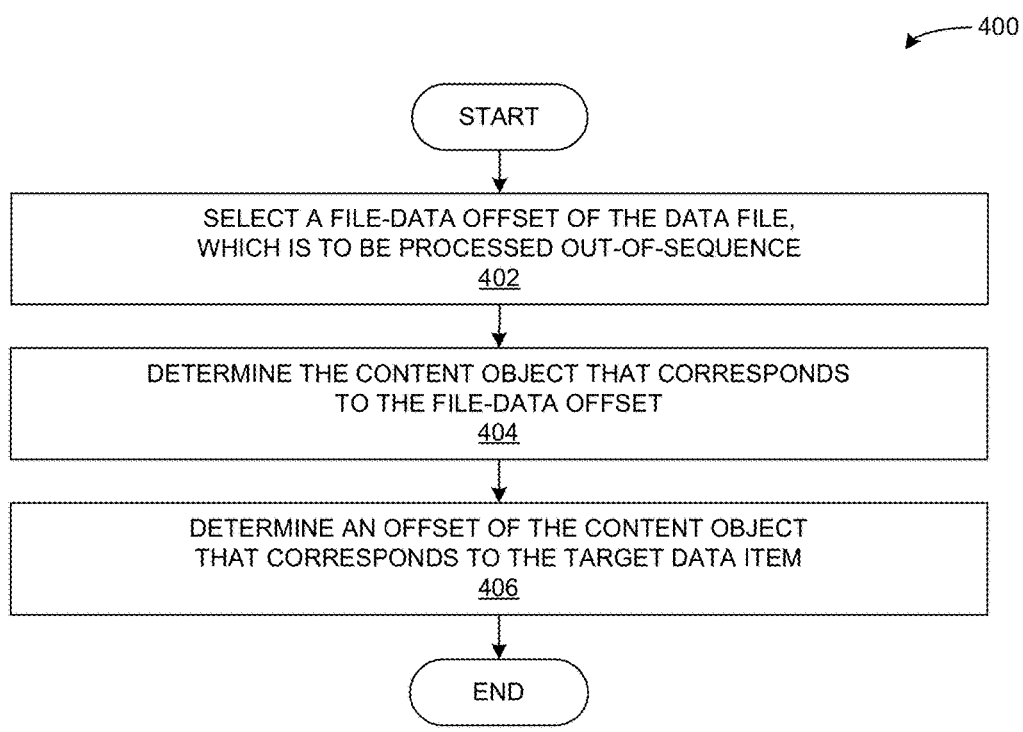
FIG. 4 presents a flow chart illustrating a method for determining a target object for which to generate a reference in accordance with an embodiment.

FIG. 4 presents a flow chart illustrating a method for determining a target content object for which to generate a reference in accordance with an embodiment. The system begins by selecting a file-data offset of the data file, which is to be processed out-of-sequence (operation 402). For example, the data file may be an executable file or a media stream that includes data items that are to be processed out-of-sequence, and determines an offset, from the start of the data file, for each of these data items. The system then determines which content object corresponds to the file-data offset (operation 404), and determines a content-object offset, from the start of the content object, that corresponds to the target data item (operation 406). The target content object and the content object's offset together make up the reference to the data item mapped to by the file-data offset.

Figure 5:
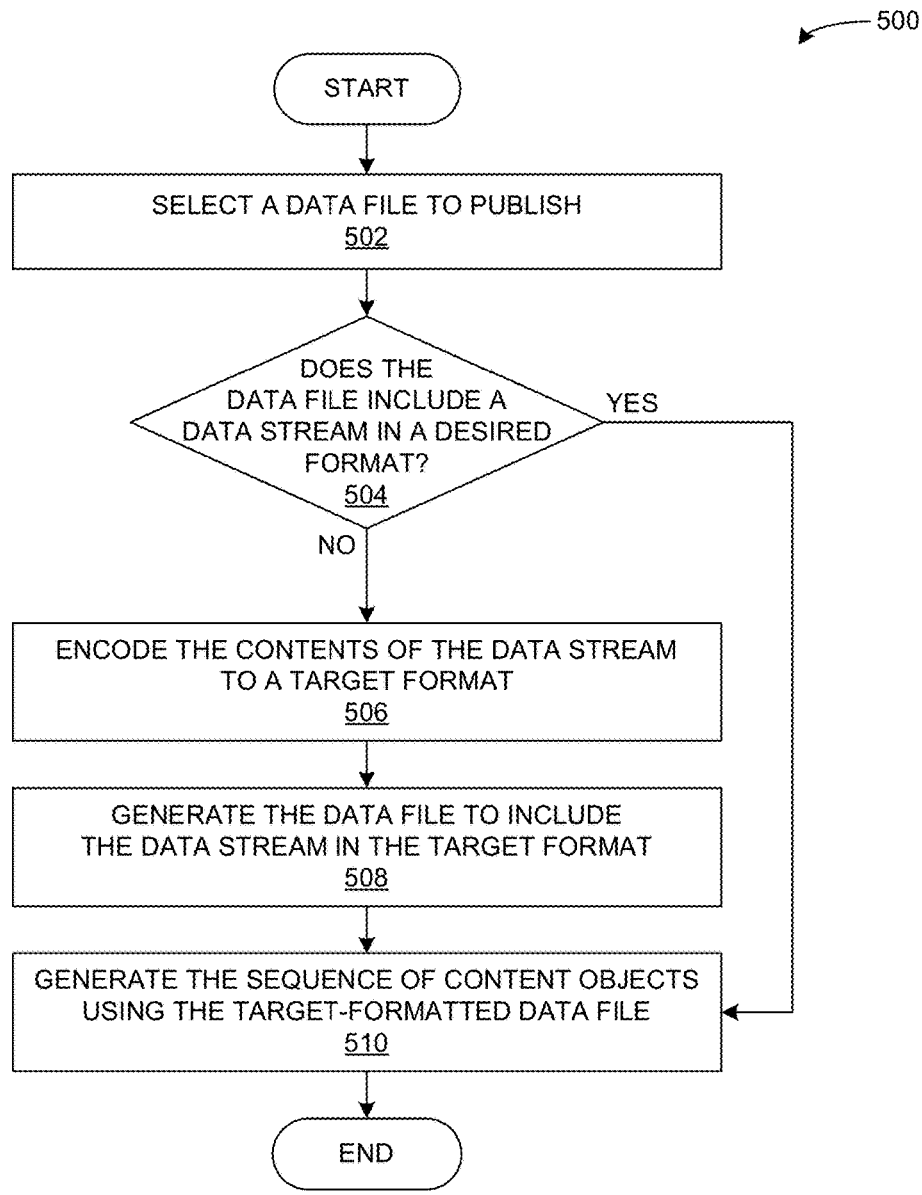
FIG. 5 presents a flow chart illustrating a method for encoding a media stream to a target format in accordance with an embodiment.

FIG. 5 presents a flow chart illustrating a method for encoding a media stream to a target format in accordance with an embodiment. During operation, the system selects a data file to publish (operation 502). Data files include, but are not limited to, a data item, a CCN content object, a media stream, an executable program, etc. In one embodiment, the system determines whether the data file includes a media stream (operation 504), and if so, encodes the contents of the media stream to a target format (operation 506). The system then generates a data file to include the media stream in the target format (operation 508). Subsequently, the system generates the sequence of content objects using the target-formatted data file (operation 512). Note that each content object may have a starting or ending boundary that is aligned with a data item's starting boundary, ending boundary, or an offset between the data item's starting and ending boundaries.

Otherwise, if the data file does not include a media stream, the data file is in the target format, and the server proceeds to generate the sequence of content objects for the data file (operation 510).

In some embodiments, the system can also encode other data streams into a different target format that facilitates processing data out-of-sequence, before downloading the complete file. For example, the data stream can include a presentation (e.g., a PowerPoint document), executable code, etc. Then, during operation 506, the system can encode the data stream into a target format that facilitates accessing individual data items of the data stream as needed, such as into a sequence of images, a sequence of instruction-code blocks, etc.

Figure 6:
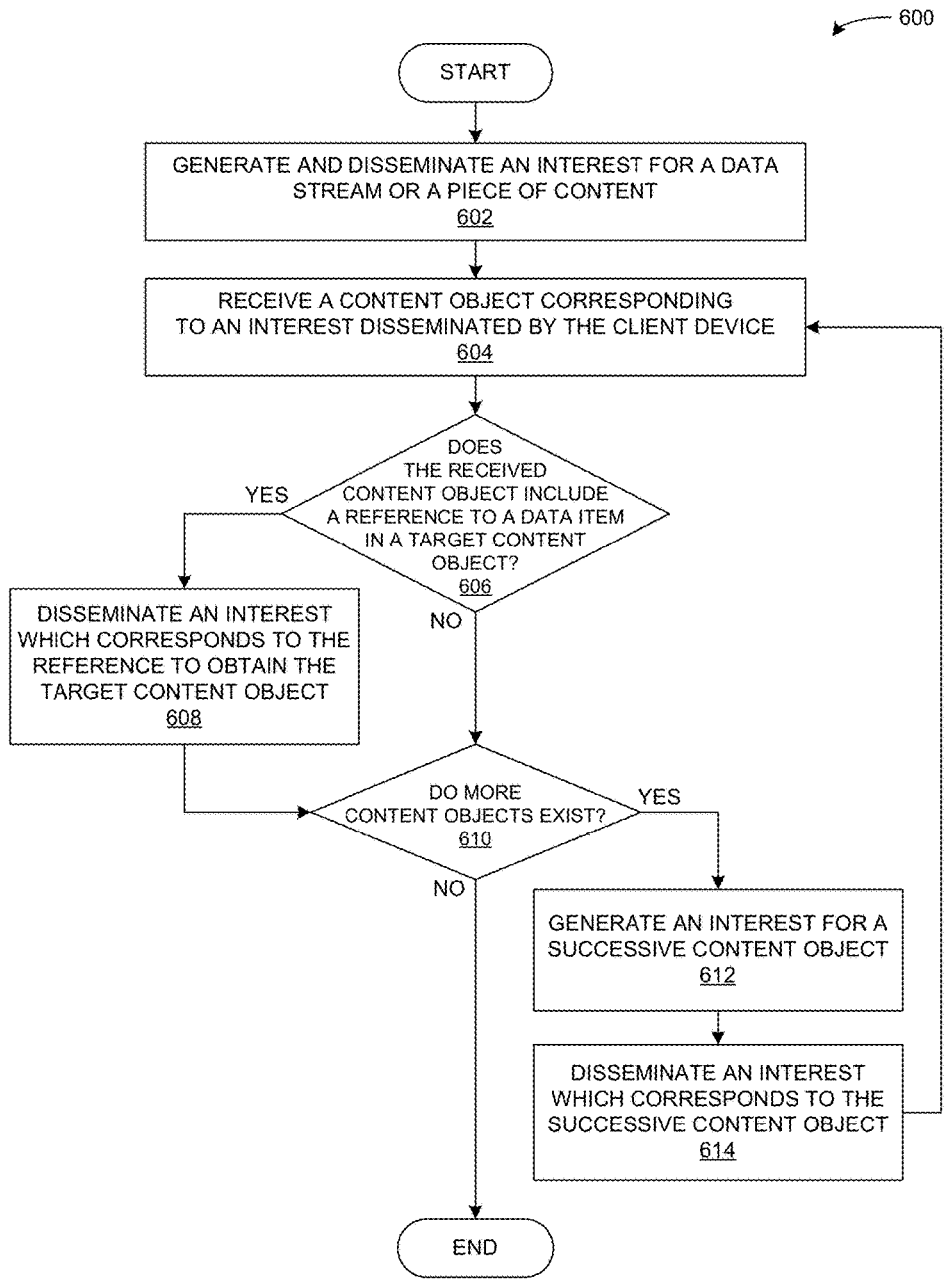
FIG. 6 presents a flow chart illustrating a method for generating interests and obtaining content objects in accordance with an embodiment.

FIG. 6 presents a flow chart illustrating a method for generating interests and obtaining content objects in accordance with an embodiment. Recall that some content objects from a data stream may include references to a data item of a target content object. During operation, a client generates and disseminates an interest for a piece of content across a content-centric network (operation 602). After disseminating the interest, the client receives the content object corresponding to the interest (operation 604), and determines whether the received content object includes a reference to a data item from a target content object (operation 606).

If the content object is found to include a reference to a target content object, the client disseminates an interest corresponding to the reference to obtain the target content object (operation 608). In some embodiments disseminating the interest causes routers of a content-centric network to propagate the interest to a content server that stores the content object. However, if the content object does not include a reference, the system can proceed to operation 610.

The client device then determines whether more content objects exist for the data stream (operation 610). If the client determines that there are no more content objects to obtain for the data stream, the client device has received all the content objects that make up the data stream and ends the process. Otherwise, the client device generates an interest for a successive content object (operation 612), and disseminates the interest corresponding to the successive content object (operation 614).

In some embodiments, after disseminating an interest (e.g., at operation 608 or operation 614), the system returns to operation 604 to receive more content objects for the data stream.

Figure 7:
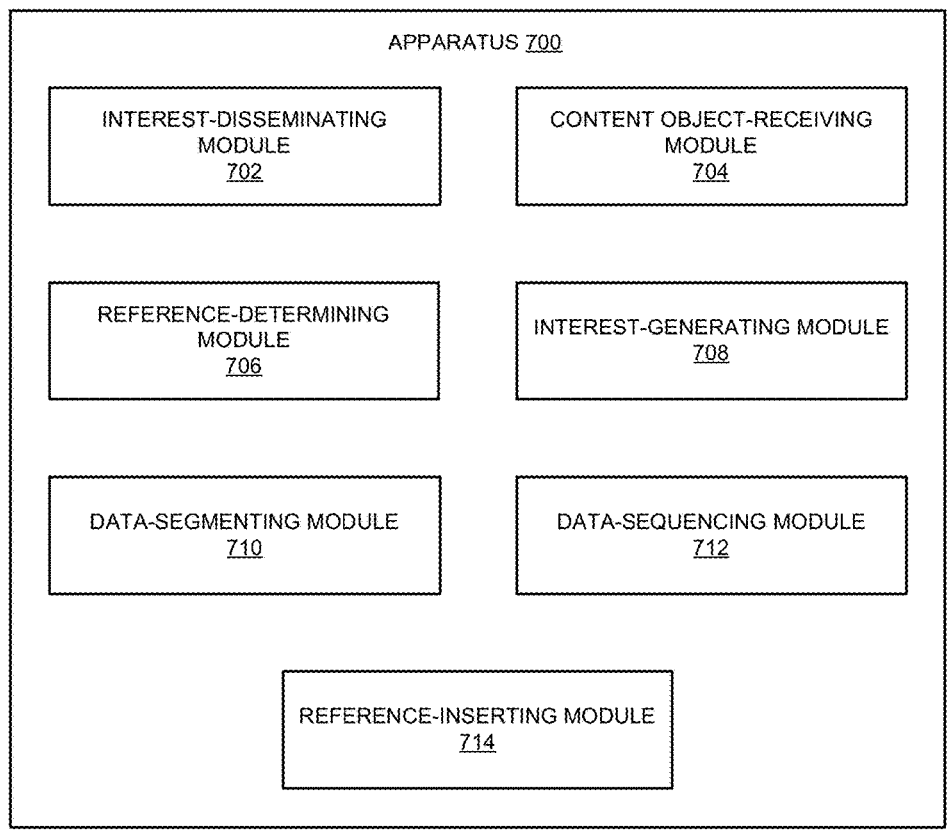
FIG. 7 illustrates an exemplary apparatus that facilitates receiving and processing a data stream over a content-centric network in accordance with an embodiment.

FIG. 7 illustrates an exemplary apparatus 700 that facilitates receiving and processing a data stream over a content-centric network in accordance with an embodiment. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise an interest-disseminating module 702, a content object-receiving module 704, a reference-determining module 706, an interest-generating module 708.

During operation, once a client device generates an interest, interest-disseminating module 702 disseminates this interest over a content-centric network. After the interest is disseminated, if content objects are returned, content object-receiving module 704 receives these content objects. Reference-determining module 706 is then able to determine whether these content objects contain references to target content objects. If these content objects contain references, interest-disseminating module 702 disseminates an interest which corresponds to the reference. Otherwise, or additionally, interest-generating module 708 generates an interest which corresponds to a successive content object. Once again, interest-disseminating module 702 then disseminates an interest for the successive content object.

Figure 8:
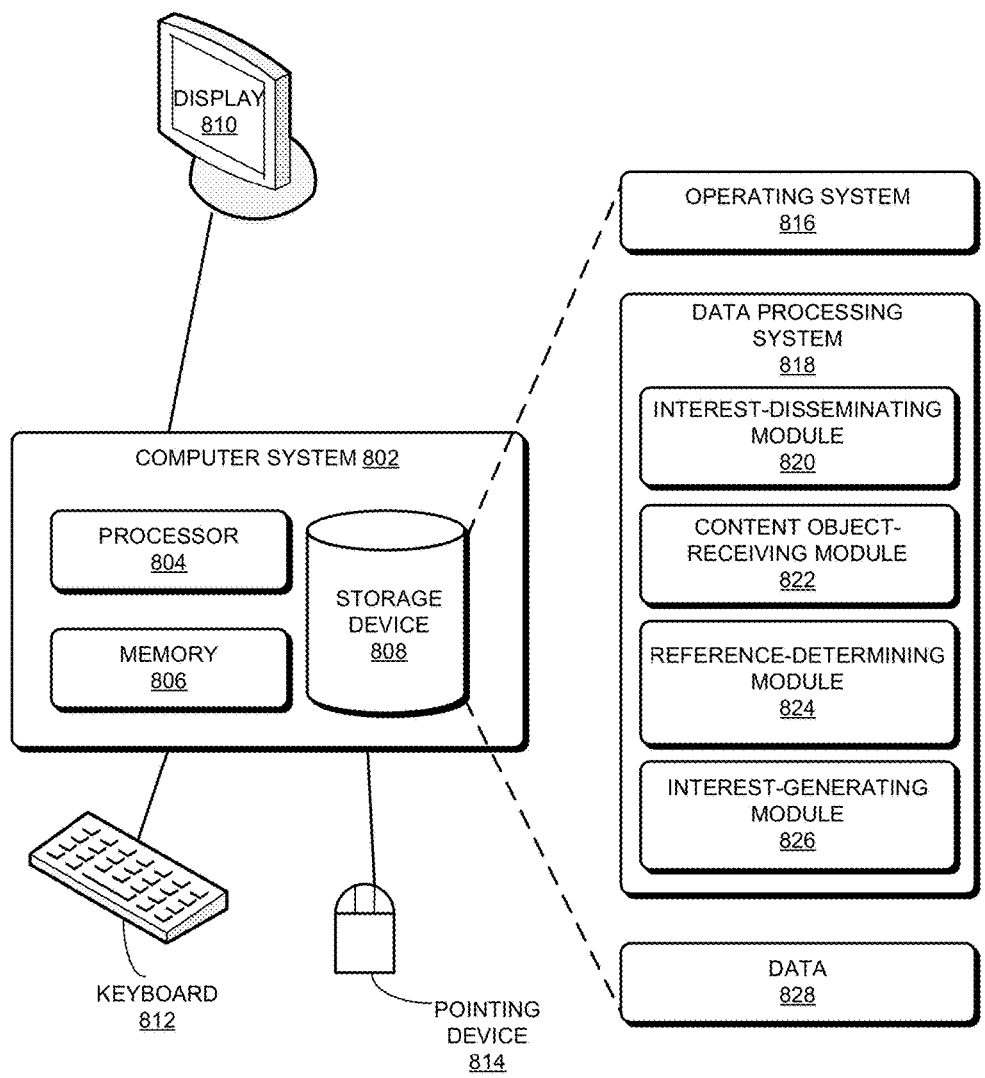
FIG. 8 illustrates an exemplary computer system that facilitates receiving and processing a data stream over a content-centric network in accordance with an embodiment.

FIG. 8 illustrates an exemplary computer system 802 that facilitates receiving and processing a data stream over a content-centric network in accordance with the presence or lack of a reference. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store operating system 816, data processing system 818, and data 828.

Data processing system 818 can include instructions which, when executed by computer system 802, can cause computer system 802 to perform methods and/or processes described in this disclosure. Specifically, data processing system 818 may include instructions for disseminating an interest for content over a content-centric network (interest-disseminating module 820), and can include instructions for receiving a content object that satisfies the interest (content object-receiving module 822).

Data processing system 818 can also include instructions to determine whether a content object includes a reference that recommends data from a target content object (reference-determining module 824). Data processing system 818 can also include instructions for generating an interest for a recommended content object and/or for a successive content object (interest-generating module 826). Further, interest-disseminating module 820 can disseminate the interest that has been generated for the recommended content object or the successive content object.

Data 828 can include any data that is required as input or that is generated as output by the methods and/or processes described in this disclosure.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
segmenting, by a computer, digital content into a sequence of content objects;
determining a target content object of the sequence of content objects, wherein the target content object is to be processed out-of-sequence;
determining a source content object of the sequence of content objects, wherein the target content object is to be processed after the source content object;
inserting a reference into the source content object, wherein the reference indicates that the target content object is to be processed following the source content object, wherein the reference is distinct from a name for the source content object; and
storing the sequence of content objects, wherein the sequence includes the reference inserted into the source content object.

2. The method of claim 1, wherein the digital content includes a plurality of data items, and wherein a content object's starting boundary or ending boundary corresponds to one or more of:
a starting boundary of a data item;
an ending boundary of a data item; and
an offset between a data item's starting boundary and ending boundary.

3. The method of claim 1, wherein the reference comprises one or more of:
an identifier for the target content object; and
a data offset within the target content object.

4. The method of claim 3, wherein the identifier includes a hierarchically structured variable-length identifier.

5. The method of claim 1, wherein the digital content includes one or more of:
an audio stream;
a video stream;
executable instructions;
a document;
a graphical interchange format file;
encrypted code; and
a text stream.

6. The method of claim 1, further comprising:
encoding the contents of a source media stream to a target media-stream format; and
generating the digital content to include the source media stream in the target media-stream format.

7. The method of claim 1, wherein determining the target object involves:
determining a file-data offset of the data file, which is to be processed out-of-sequence; and
determining, from the sequence of content objects, the content object that corresponds to the file-data offset.

8. The method of claim 1, further comprising:
receiving an interest for a content object; and
in response to determining that the content object is stored in a local repository, sending the content object through an interface associated with the interest.

9. The method of claim 1, further comprising publishing the sequence of content objects, wherein publishing a respective content object involves:
disseminating an advertisement for the content object over a content-centric network.

10. A computer-implemented method comprising:
disseminating, by a client computing device, an interest for digital content, wherein a name for the interest is a hierarchically structured variable length identifier comprised of contiguous name components ordered from a most general level to a most specific level;
receiving a content object, which corresponds to the digital content and satisfies the interest;
determining that the received content object includes a reference to a data item from a target content object, wherein the reference is distinct from a name for the received content object; and
disseminating an interest for the target content object to obtain the data item.

11. The method of claim 10, wherein the method further comprises:
generating an interest for a successive content object; and
disseminating an interest, which corresponds to the successive content object, to obtain the successive content object.

12. The method of claim 10, wherein the data item's starting boundary corresponds to one or more of:
a starting boundary of the target content object; and
an offset from the target content object's starting boundary.

13. The method of claim 10, wherein the reference indicates:
an identifier for the target content object; and
a data offset, from the target content object's starting boundary, for the data item.

14. A non-transitory computer-readable storage medium storing instructions that when executed by a computer cause the computer to perform a method, the method comprising:
segmenting, by a computer, digital content into a sequence of content objects;
determining a target content object of the sequence of content objects, wherein the target content object is to be processed out-of-sequence;
determining a source content object of the sequence of content objects, wherein the target content object is to be processed after the source content object;
inserting a reference into the source content object, wherein the reference indicates that the target content object is to be processed following the source content object, wherein the reference is distinct from a name for the source content object; and
storing the sequence of content objects, wherein the sequence includes the reference inserted into the source content object.

15. The storage medium of claim 14, wherein the digital content includes a plurality of data items, and wherein a content object's starting boundary or ending boundary corresponds to one or more of:
a starting boundary of a data item;
an ending boundary of a data item; and
an offset between a data item's starting boundary and ending boundary.

16. The storage medium of claim 14, wherein the reference comprises one or more of:

an identifier for the target content object; and
a data offset within the target content object.

17. The storage medium of claim 16, wherein the identifier includes a hierarchically structured variable-length identifier.

18. The storage medium of claim 14, wherein the digital content includes one or more of:
   an audio stream;
   a video stream;
   executable instructions;
   a document;
   a graphical interchange format file;
   encrypted code; and
   a text stream.

19. The storage medium of claim 18, further comprising:
   encoding the contents of a source media stream to a target media-stream format; and
   generating the digital content to include the source media stream in the target media-stream format.

20. The storage medium of claim 14, wherein determining the target object involves:
   determining a file-data offset of the data file, which is to be processed out-of-sequence; and
   determining, from the sequence of content objects, the content object that corresponds to the file-data offset.

21. The storage medium of claim 14, further comprising:
   receiving an interest for a content object; and
   in response to determining that the content object is stored in a local repository, sending the content object through an interface associated with the interest.

22. The storage medium of claim 14, further comprising publishing the sequence of content objects, wherein publishing a respective content object involves disseminating an advertisement for the content object over a content-centric network.

23. A non-transitory computer-readable storage medium storing instructions that when executed by a computer cause the computer to perform a method, the method comprising:
   disseminating an interest for digital content, wherein a name for the interest is a hierarchically structured variable length identifier comprised of contiguous name components ordered from a most general level to a most specific level;
   receiving a content object, which corresponds to the digital content and satisfies the interest;
   determining that the received content object includes a reference to a data item from a target content object, wherein the reference is distinct from a name for the received content object; and
   disseminating an interest for the target content object to obtain the data item.

24. The storage medium of claim 23, wherein the method further comprises:
   generating an interest for a successive content object; and
   disseminating an interest, which corresponds to the successive content object, to obtain the successive content object.

25. The storage medium of claim 23, wherein the data item's starting boundary corresponds to one or more of:
   a starting boundary of the target content object; and
   an offset from the target content object's starting boundary.

* * * * *